(12) United States Patent
Dattilo et al.

(10) Patent No.: US 7,880,921 B2
(45) Date of Patent: Feb. 1, 2011

(54) METHOD AND APPARATUS TO DIGITALLY WHITEOUT MISTAKES ON A PRINTED FORM

(76) Inventors: Michael Joseph Dattilo, 404 Calloway White Rd., Winchester, KY (US) 40391; Juan Carlos Rodriguez, 415 Davidson Ct., Lexington, KY (US) 40508

(*) Notice: Subject to any disclaimer, the term of this patent is extended or adjusted under 35 U.S.C. 154(b) by 700 days.

(21) Appl. No.: 11/742,669

(22) Filed: May 1, 2007

(65) Prior Publication Data

US 2008/0273227 A1 Nov. 6, 2008

(51) Int. Cl.
*H04N 1/387* (2006.01)
*G06K 15/02* (2006.01)
*G06F 17/24* (2006.01)

(52) U.S. Cl. ............... 358/1.18; 358/452; 358/453; 715/224; 715/246; 715/255; 715/272; 715/274

(58) Field of Classification Search .......... 358/1.9, 358/1.2, 1.18, 527, 528, 537, 538, 451, 452, 358/453; 715/221, 222, 223, 224, 243, 246, 715/252, 255, 272, 273, 274, 781, 866; 345/620, 345/625, 628, 660, 667; 382/282, 309, 311
See application file for complete search history.

(56) References Cited

U.S. PATENT DOCUMENTS

| | | | | |
|---|---|---|---|---|
| 4,751,583 A | * | 6/1988 | Levine | 358/452 |
| 5,596,346 A | * | 1/1997 | Leone et al. | 358/453 |
| 6,532,349 B1 | * | 3/2003 | Todome | 399/81 |
| 6,701,350 B1 | * | 3/2004 | Mitchell | 715/781 |
| 7,522,777 B2 | * | 4/2009 | Tsukui | 382/240 |
| 2003/0231367 A1 | * | 12/2003 | Quintana | 358/527 |

* cited by examiner

*Primary Examiner*—Scott A Rogers

(57) ABSTRACT

A method enables users to make corrections to printed forms using a computer arrangement. The printed form is scanned and displayed to the user on a display of the computer arrangement. The user selects one or more regions of the printed form to be corrected. The selected regions are digitally whited out to create a corrected image that can be output to a printer.

6 Claims, 5 Drawing Sheets

METHOD AND APPARATUS TO DIGITALLY WHITEOUT MISTAKES ON A PRINTED FORM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to pre-printed forms and, more particularly, to computer software for correcting errors made while filling out pre-printed forms.

2. Description of the Related Art

Despite the widespread use of computers in modern society, pre-printed forms are still commonly used to collect and process information. On a weekly basis, people are asked to fill out completed forms to apply for jobs, enroll children in schools, register children for recreational activities, order goods by mail, subscribe to magazines, register to vote, and apply for a driver's license. People frequently make mistakes when completing forms, for example, by entering information in the wrong place on the form. Means available to most people to correct errors when another form is not available are somewhat limited. People can strike out the incorrect information or otherwise annotate the document to indicate the error. In some cases, correction tape or white-out can be used to mask the incorrect information. However, these common solutions are not entirely satisfactory in that the result may reflect lack of care on the part of the person completing the form.

SUMMARY

A method and apparatus enables users to make corrections to printed forms. The printed form is scanned and displayed to the user on a display of a computer arrangement. The user interacts with the computer arrangement via user input devices to select one or more regions of the printed form to be corrected. The selected regions are digitally whited-out to create a corrected image that can be output to a printer.

An exemplary method comprises scanning the printed form to create a first digital image of the printed form, displaying the first digital image of the printed form to the user on a display, receiving user input indicating one or more selected regions of the printed form, digitally whiting out the selected regions of the printed form to create a corrected form, and outputting the corrected form to an output device.

An exemplary computer arrangement comprises a display and a processor connected to the display. The processor is configured to output a first digital image of the printed form to a display, receive user selection input indicating one or more selected regions of the printed form, digitally white out the selected regions of the printed form to create a corrected image; and output the corrected image to an output device.

An exemplary computer readable media contains code for outputting a first digital image of the printed form to a display of said computer, code for receiving user selection input indicating one or more selected regions of the printed form, code for digitally whiting out the selected regions of the printed form to create a corrected image; and code for outputting the corrected image to an output device connected to the computer.

BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

DETAILED DESCRIPTION

Figure 1:
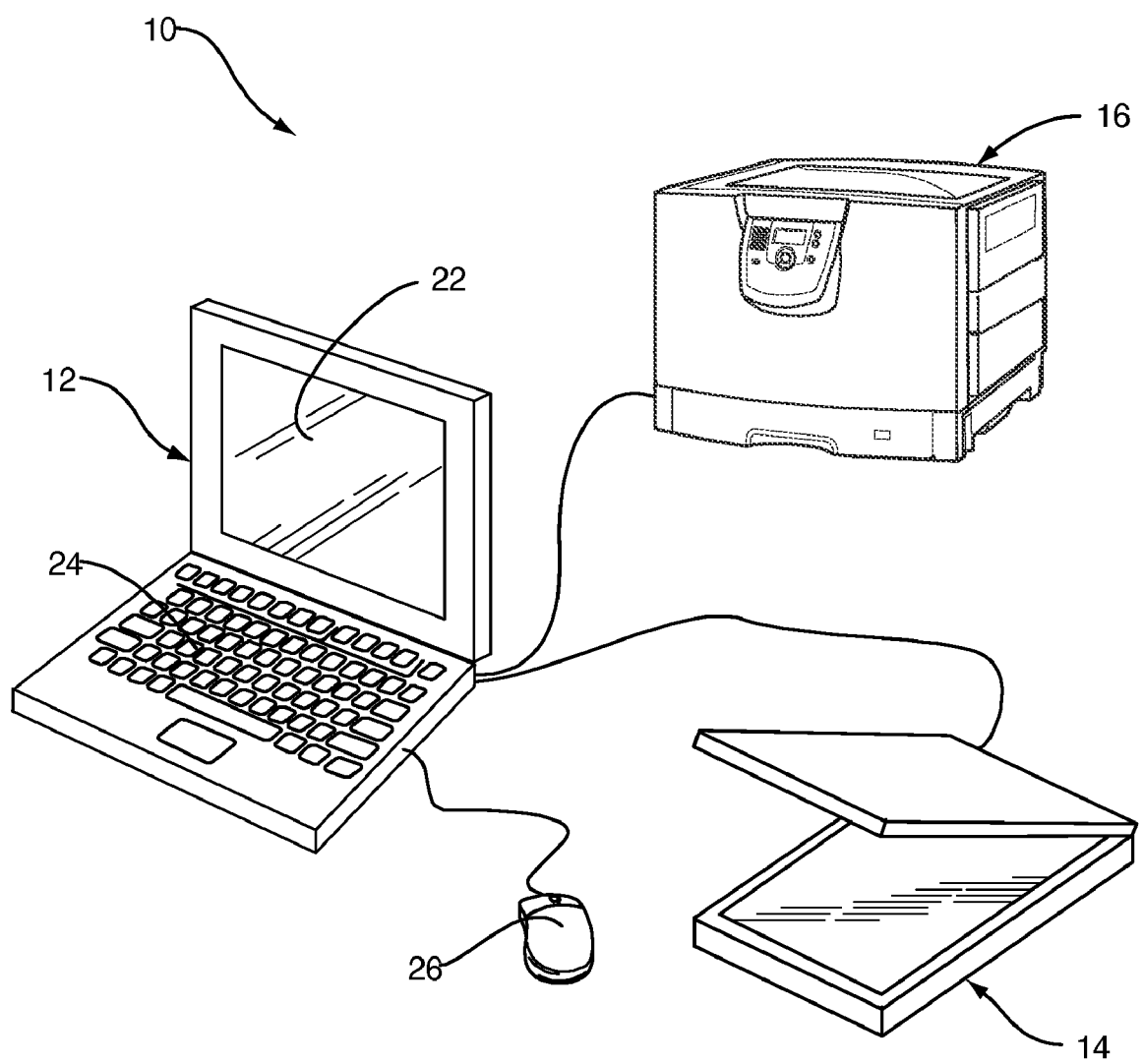
FIG. 1 illustrates an exemplary computer system.

Referring now to the drawings, FIG. 1 illustrates an exemplary computer system 10 for implementing the present invention. Computer system 10 comprises a computer 12, a scanner 14, and a printer 16. The computer 12 may comprise any conventional desktop, laptop, or notebook computer having a display 22, keyboard 24, mouse 26 and/or other user input device. The scanner 14 and printer 16 connect to the computer 12 through wired or wireless links. Though shown separately, the scanner 14 and printer 16 may be incorporated into a single unit. The scanner 14 scans printed forms or other documents and generates digital images that can be stored, transmitted, or displayed by the computer 12. As will be described in greater detail below, a digital whiteout application is installed on the computer 12 that enables users to make corrections to digital copies of scanned forms. The digitally corrected copies of scanned forms can be output to the printer 16 which may, for example, comprise a laser printer or inkjet printer.

Figure 2:
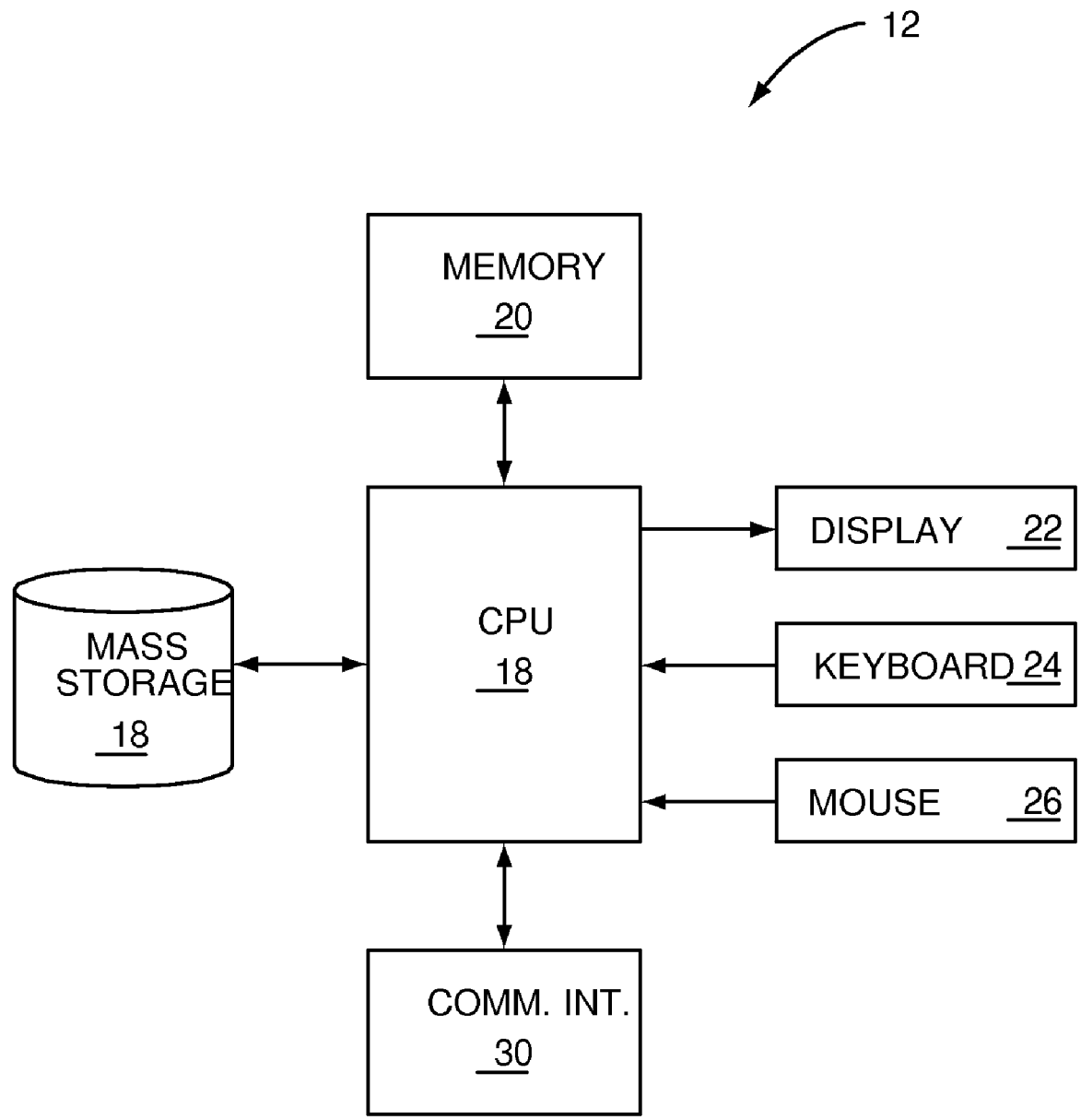
FIG. 2 illustrates an exemplary computer.

FIG. 2 illustrates an exemplary computer 12. The computer 12 comprises a central processing unit (CPU) 18 and memory 20 arranged to execute software, such as the digital whiteout application described below. Display 22 provides a visual output for viewing by a user. User input devices, such as keyboard 24 and mouse 26, enable a user to input commands and data into the computer 12. As is known in the art, application programs may display a graphical user interface on the computer display 22, and the user may interact with the graphical user interface using the keyboard 24, mouse 26, and/or other user input devices. Computer 12 may further include a mass storage device 28 such as a magnetic disk drive or optical disk drive, and a communications interface 30 for communicating with remote devices over a communication network. The communication interface 30 may, for example, comprise an Ethernet interface, a serial interface (e.g., USB), a parallel interface (e.g. Firewire), or a radio interface (e.g., Bluetooth, WiFi).

The digital whiteout application is stored in memory 20 of the computer 12. The digital whiteout application allows users to digitally whiteout mistakes made while completing printed forms. The digital whiteout application includes a simple graphical user interface to make it easy for a novice user to correct mistakes in a printed form. The whiteout process can be divided into three simple processes, the scanning process, the selection process, and the final review process. To correct mistakes in a printed form, the user first scans the form to create a digital image of the form (the scanning process), uses simple selection tools to select regions that are to be whited out (the selection process), and outputs the corrected form to a printer or other output device (the final review process).

To begin the digital whiteout process, the user first scans the printed form to create a digital bitmap image of the form. The digital image may be in any file format, such as tiff, gif, bmp, etc. The printed form can be scanned using scanning software that is packaged with the scanner. In this case, the digital image can be stored in the computer file system and opened in the digital whiteout application. Alternatively, the digital whiteout application may control the scanning process to acquire and display the digital image. After the digital image is scanned, it is displayed to the user in a graphical user interface associated with the digital whiteout application.

Figure 3A:
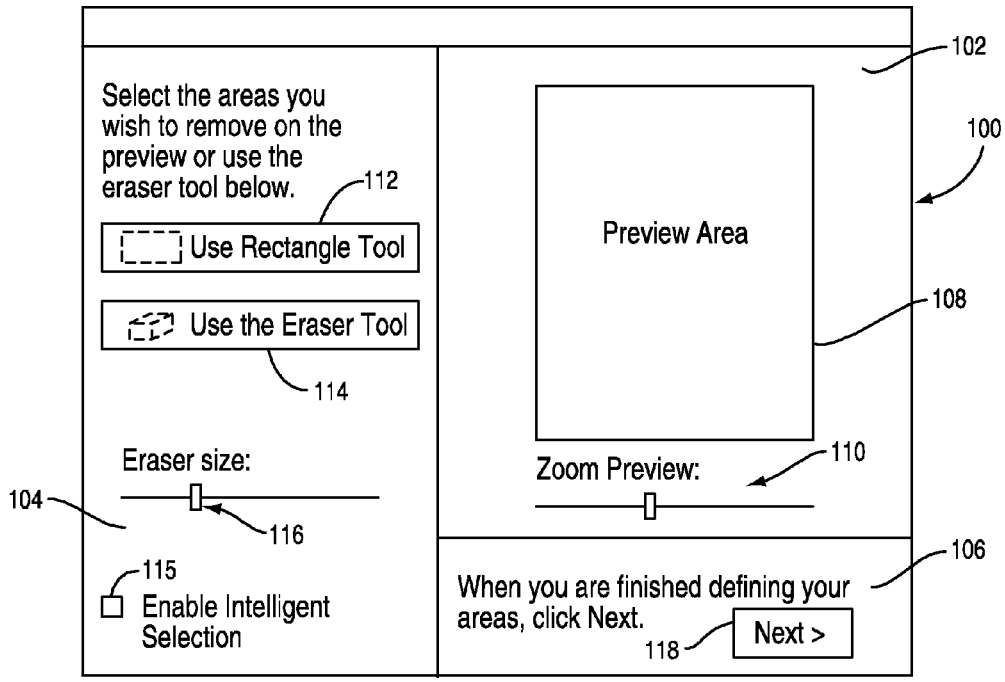
FIGS. 3A-3B illustrate graphical interfaces associated with a white-out application.
Figure 3B:
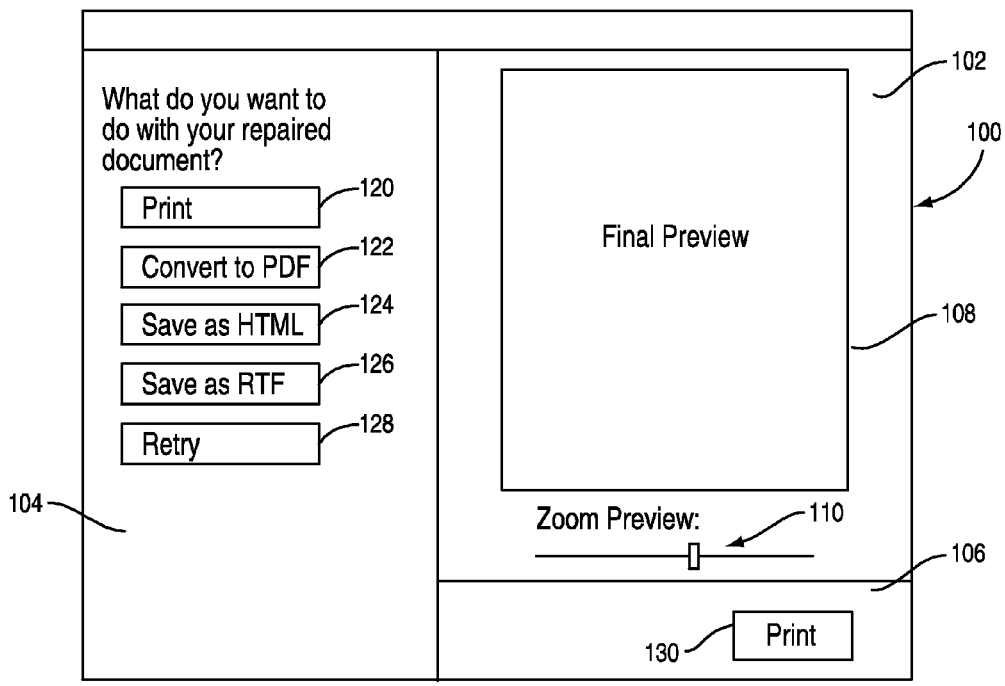

FIGS. 3A and 3B illustrate a graphical user interface 100 associated with the digital whiteout application in one exemplary embodiment. FIG. 3A shows the interface 100 during the selection process, and FIG. 3B shows the interface 100 during the final review process. The graphical user interface 100 may be displayed in a conventional window that includes a window frame, title bar, menu bars, tool bars, status bars, resizing handles, etc. As known in the art, the window can be moved and resized as desired. The graphical user interface 100 divides the display area of the window into three panels: a display panel 102, a side panel 104, and a bottom panel 106. The display panel 102 is used to display the digital image of the scanned form to the user. The user can manipulate the image in the preview area 108 and select desired regions to be whited out. The side panel 104 contains selection tools during the selection process (FIG. 3A) and presents output options to the user during the final review process (FIG. 3B). The bottom panel displays may contain command buttons and/or navigation controls depending on the context.

FIG. 3A illustrates the graphical user interface as it might appear during the selection process. Digital images of scanned forms are displayed to the user in a preview area 108 in the display panel 102. In the exemplary embodiment, a zoom control 110 is disposed below the preview area 108. The zoom control 110 allows the user to zoom the image in or out. In the exemplary embodiment, the zoom control 110 comprises a slide control. Sliding the control 110 to the right enlarges the image, and sliding the control 110 to the left diminishes the image. The user may also pan the image by clicking and dragging on the image.

The side panel 104 includes a collection of selection tools for the user. In the exemplary embodiment, the selection tools include a rectangle tool 112 and an eraser tool 114, although other selection tools in addition to or in place of these tools could be used. The selection tools are used by a user to select regions in a scanned image that are to be digitally whited out. The rectangle tool 112 allows the user to draw a rectangle around a selected region. The rectangle tool 112 is particularly useful for selecting large areas. The eraser tool 114 is a specialized region selection tool that allows the user to select small areas the size of the eraser 114. The selected regions could be of any shape, such as circular or rectangular. The eraser tool 114 includes a size control 116 that allows the user to change the size of the eraser. The eraser tool 114 in the exemplary embodiment includes a slide control. Sliding the size control 116 to the right increases the size of the eraser 114, and sliding the size control 116 to the left decreases the size of the eraser 114. The bottom panel 106 includes a NEXT button 118. Selection of the NEXT button 118 by the user indicates that the user has completed his or her selections and ends the selection process. When the NEXT button is selected, the interface 100 shown in FIG. 3B is displayed.

FIG. 3B illustrates the graphical user interface 100 during the final review process. When the selection process ends, the printed form may be rescanned at a high resolution (e.g., 300 dpi or greater) to create a high resolution digital image. During the rescanning process, the selected regions are digitally whited out and the resulting image is displayed to the user in the preview window 108. The display panel 102 includes a zoom control 110 as previously described to enable the user to zoom the image. As noted before, the use may also pan the image by clicking on the image and dragging the image. The side panel 104 contains a collection of command buttons providing different options to the user. In the exemplary embodiment shown in FIG. 3B, the command buttons include a PRINT button 120, SAVE AS PDF button 122, SAVE AS HTML button 124, SAVE AS RTF button 126, and RETRY button 128. Selection of the PRINT button causes the displayed image to be output to a printer 16. The three SAVE AS buttons 122, 124, 126 save the displayed image to the computer file system in the selected format. Selection of the RETRY button causes the digital whiteout application to return to the selection process. A second PRINT button 130 is displayed to the user in the bottom panel 106. The PRINT button 130 in the bottom panel 106 has the same function as the PRINT button 120 in the side panel 104.

Figure 4:
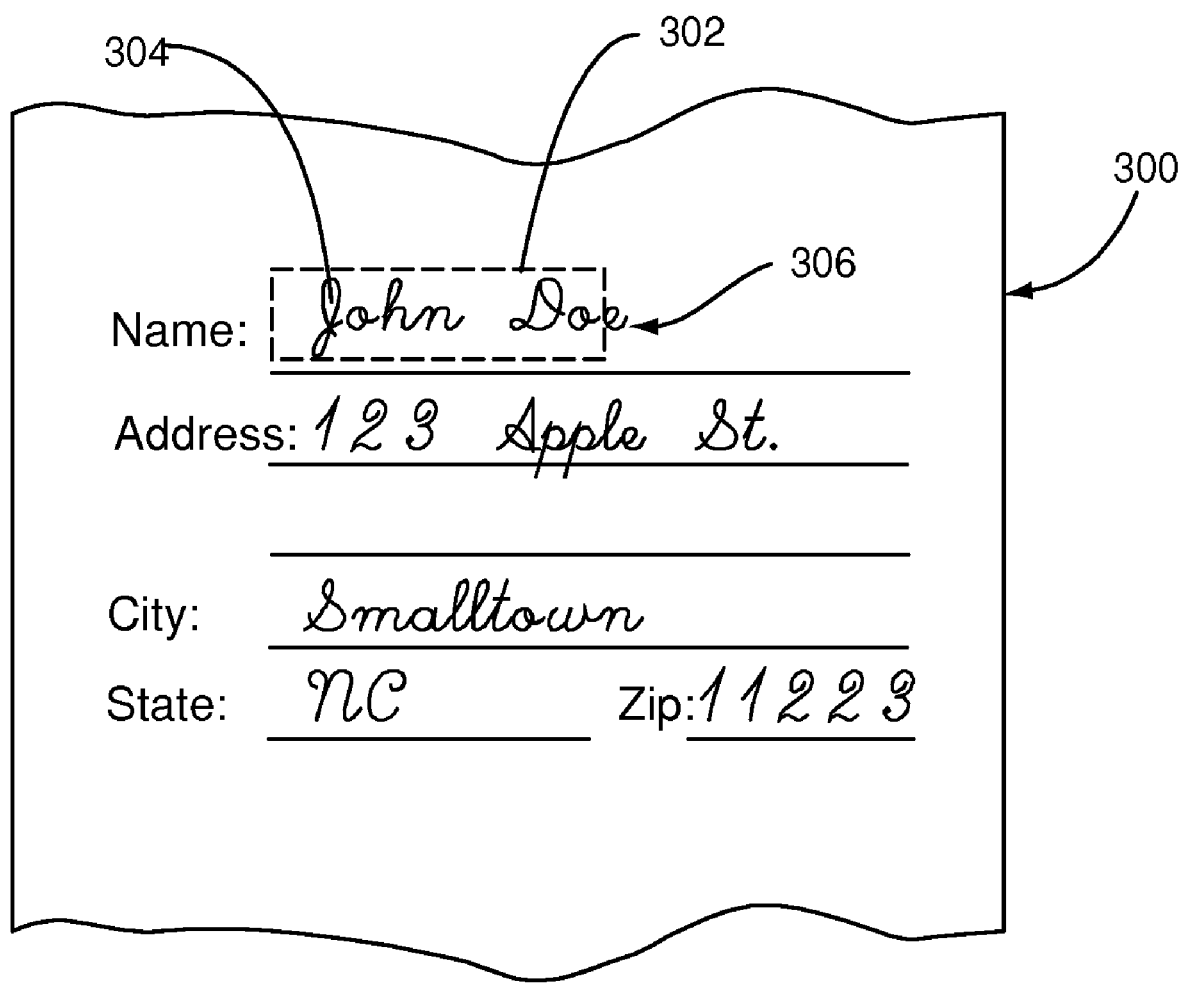
FIG. 4 illustrates a portion of a printed form.

The digital whiteout application may include an expansion function to expand a selection made by the user. The expansion function is useful in cases where the user selection does not fully contain the undesired markings on a printed form as shown in FIG. 4. FIG. 4 illustrates a printed form 300 with a user selection 302 containing an undesired mark 304, which in this example is the name John Doe. A small portion 306 of the undesired mark extends beyond the boundary of the user-selected region. In this case, the expansion function may be invoked to expand the user selection to more fully contain the undesired marking. More particularly, the expansion function may implement an edge detection algorithm or nearest-pixel algorithm that effectively traces around the edge of the undesired marking. The area traced by the edge detection algorithm is added to the user-selected region to create an expanded region. The digital whiteout operation is then performed over the expanded region. The user may have the option of enabling/disabling the expansion function. For example, an enable intelligent selection check box 115 may be displayed to the user as shown in FIG. 3A for enabling and disabling the expansion function.

Figure 5:
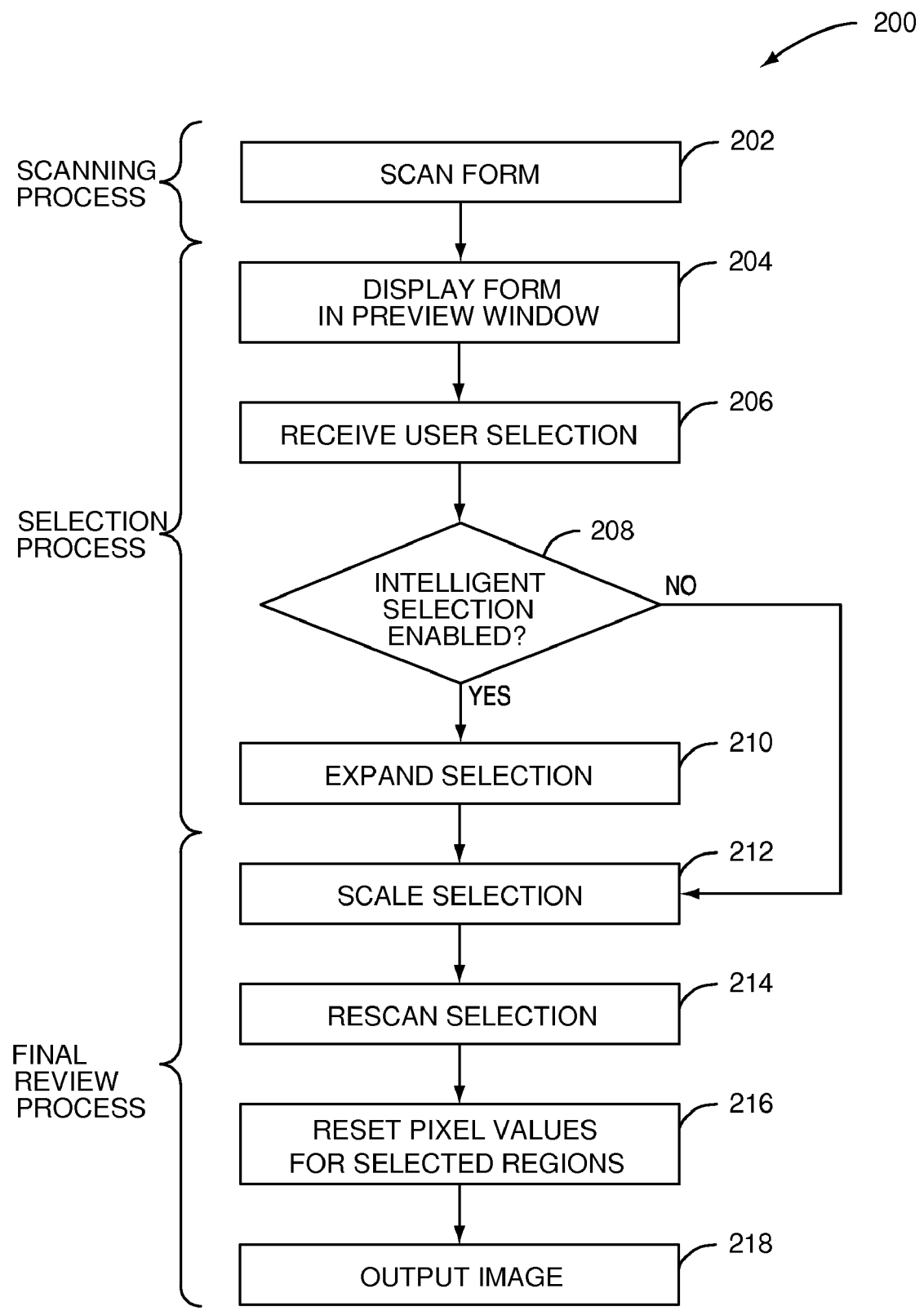
FIG. 5 illustrates a method implemented by an exemplary white-out application.

FIG. 5 illustrates an exemplary method 200 implemented by the digital whiteout application. The digital whiteout application may control the scanner 14 to scan a printed form to be corrected (block 202). When the scan is complete, the application acquires image data from the scanner and displays the digital image of the printed form to the user (block 204). The initial image acquired for the selection process may be a low resolution image (e.g., 72 dpi) that still enables the user to see the image clearly and to select the desired regions to be corrected. Using a low resolution image for the selection process allows the user to more quickly make his or her selections without having to wait for a high resolution scan to be completed.

After the image is displayed, the application receives input indicating user selection of one or more regions of the digital image to be corrected (block 206). The user may use the rectangle tool 112 to draw a rectangle around a desired region, or may use the eraser tool 114 to designate smaller regions. As previously described, the user may zoom and pan the image. When the user indicates that the selection process is complete (e.g., the user presses the NEXT button 118), the application determines whether the intelligent selection option is enabled (block 208). If so, the expansion function in the application is called to expand or extend the user-selected area (block 210). As previously indicated, the extended region is added to the user-selected region.

After the selection process is complete, the application controls the scanner to rescan the form (block 214) at a high resolution (e.g. 300 dpi or greater). The selected regions (both user-selected regions and expanded regions) may optionally be scaled if the preview image is a low resolution image and the final output image is a high resolution image (block 212). During the scanning process, the pixel values contained within the selected region are set to white (255, 255, 255) (block 216). Those skilled in the art will recognize that the second scanning process can be eliminated in some embodiments if the original scan is at a high resolution. After the user selects an output option, the corrected image is output to an output device or saved to the computer file system (block 218).

The digital whiteout application provides an easy and convenient method for a novice user to correct mistakes made while completing a printed form. The digital whiteout application can restore forms on which mistakes have been made without damaging the document. The restored form will be virtually indistinguishable from the original form. Users may find the result more acceptable than either marking through mistakes or using liquid whiteout or correction tape.

What is claimed is:

1. A method of correcting errors made while completing a printed form, comprising:
   scanning by a scanner the printed form to create a first digital image of the printed form;
   displaying the first digital image of the printed form to the user on a display;
   receiving user input indicating one or more selected regions of the printed form;
   expanding a user selected region to encompass undesired markings that extend outside the boundaries of the user selected region;
   digitally whiting out the selected regions of the printed form to create a corrected image; and
   outputting the corrected image to an output device.

2. The method of claim 1, wherein expanding a user selected region comprises detecting the edge of the undesired markings that extend outside the boundaries of the user selected region with an edge detection algorithm.

3. A computer arrangement for digitally correcting mistakes made on printed forms, said device comprising:
   a display; and
   a processor configured to:
      output a first digital image of the printed form to said display;
      receive user selection input indicating one or more selected regions of the printed form; and
      expand a user selected region to encompass undesired markings that extend outside the boundaries of the user selected region;
      digitally whiteout the selected regions of the printed form to create a corrected image; and
      output the corrected image to an output device.

4. The computer arrangement of claim 3, wherein the processor expands the user selected region using an edge detection algorithm to detect undesired markings that extend outside the boundaries of the user selected region.

5. A computer readable media containing code executable on a computer, said code comprising:
   code for outputting a first digital image of a printed form to a display of said computer;
   code for receiving user selection input indicating one or more selected regions of the printed form; and
   code for expanding a user selected region to encompass undesired markings that extend outside the boundaries of the user selected region;
   code for digitally whiting out the selected regions of the printed form to create a corrected image; and
   code for outputting the corrected image to an output device connected to the computer.

6. The computer readable media of claim 5, wherein the code for expanding the user selected region executes an edge detection algorithm to detect undesired markings that extend outside the boundaries of the user selected region.

* * * * *